(12) United States Patent
Sobel et al.

(10) Patent No.: US 7,634,814 B1
(45) Date of Patent: Dec. 15, 2009

(54) INSTANT MESSAGING (IM) COMFORTING IN ANTIVIRUS FILTERING SYSTEM AND METHOD

(75) Inventors: William E. Sobel, Stevenson Ranch, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 820 days.

(21) Appl. No.: 11/218,206

(22) Filed: Aug. 31, 2005

(51) Int. Cl.
*G06F 12/14* (2006.01)
*G06F 12/16* (2006.01)

(52) U.S. Cl. .............................. 726/25; 726/22; 726/26; 726/30; 713/188; 709/205; 709/207

(58) Field of Classification Search .................. 726/25
See application file for complete search history.

(56) References Cited

U.S. PATENT DOCUMENTS

| | | | | |
|---|---|---|---|---|
| 7,133,900 | B1 * | 11/2006 | Szeto | 709/206 |
| 7,185,285 | B2 * | 2/2007 | Van Dok et al. | 715/753 |
| 7,194,516 | B2 * | 3/2007 | Giacobbe et al. | 709/206 |
| 7,406,501 | B2 * | 7/2008 | Szeto et al. | 709/206 |
| 7,451,186 | B2 * | 11/2008 | Morinigo et al. | 709/206 |
| 7,461,339 | B2 * | 12/2008 | Liao et al. | 715/239 |
| 2003/0070176 | A1 * | 4/2003 | Parker et al. | 725/105 |
| 2004/0143632 | A1 * | 7/2004 | McCarty | 709/206 |
| 2006/0031336 | A1 * | 2/2006 | Friedman et al. | 709/206 |

OTHER PUBLICATIONS esoft, Inc., 'White Paper—Modern Network Security: The Migration to Deep Packet Inspection', 2006, esoft, Inc., entire document, http://www.esoft.com/pdf/whitepaper/DPI_white_paper.pdf.*
"iSolation Server 1.1: Stopping new and unknown viruses from entering the network", *Avinti Whitepaper*, pp. 1-18, Avinti Inc., Lindon, UT, Sep. 2004. No author provided.
"iSolation Server v1.2: Product Datasheet", pp. 1-2, Avinti Inc., Lindon, UT, Dec. 2004. No author provided.

* cited by examiner

*Primary Examiner*—Christian LaForgia
*Assistant Examiner*—Ronald Baum
(74) *Attorney, Agent, or Firm*—Gunnison, McKay & Hodgson, L.L.P.; Serge J. Hodgson (57) ABSTRACT

A computer implemented method includes intercepting transfer of an IM attachment, providing a comforting message that the IM attachment is being delayed, and evaluating the IM attachment for malicious code. Upon a determination that the IM attachment is non-malicious, the IM attachment is transferred to the recipient IM user. By explaining the delay in receipt of the IM attachment, the recipient IM user is prevented from becoming disconcerted about the delay.

20 Claims, 6 Drawing Sheets

INSTANT MESSAGING (IM) COMFORTING IN ANTIVIRUS FILTERING SYSTEM AND METHOD

BACKGROUND OF THE INVENTION

1. Field of the Invention

The present invention relates to the protection of computer systems. More particularly, the present invention relates to a system and method for protecting computer systems from malicious files.

2. Description of the Related Art

E-mails are often sent with attachments. These e-mail attachments can be malicious.

To prevent a user's computer system from becoming infected from malicious e-mail attachments, client side or gateway based proxies intercept e-mails having potentially malicious attachments and redirect the attachments to a scanning engine. The scanning engine determines whether the attachment contains malicious code using any one of a number of techniques well known to those of skill in the art. Upon a determination that the attachment is non-malicious, the e-mail including attachment is released to the user.

Depending upon the particular scanning technique employed as well as the number of attachments being scanned by the scanning engine, determining whether the attachment contains malicious code can require a significant amount of time. Thus, the delay in the e-mail including attachment reaching the designated user can be significant. However, because the user is typically not expecting the e-mail and delays in e-mail transmission are common, the delay in the e-mail including attachment typically goes unnoticed by the user or at least does not cause any concern to the user.

The instantaneous nature of an instant messaging (IM) environment makes detection and cleaning of malicious code fundamentally different than the detection and cleaning of malicious code in the e-mail environment. Specifically, unlike an e-mail user, an IM user is typically actively engaged in a real-time exchange, e.g., conversation, when an IM attachment is sent to the IM user. Thus, the IM user expects the IM attachment without delay.

For this reason, use of traditional e-mail attachment interception and scanning techniques for an IM attachment are inconsistent with an IM user's expectation of receiving of the IM attachment in real-time and are therefore disconcerting to the IM user. Accordingly, traditional e-mail attachment interception and scanning techniques are not suitable for detection and cleaning of malicious code in IM attachments.

SUMMARY OF THE INVENTION

In accordance with one embodiment, a computer implemented method includes intercepting transfer of a file such as an IM attachment, providing a comforting message that the IM attachment is being delayed, and evaluating the IM attachment for malicious code. Upon a determination that the IM attachment is non-malicious, the IM attachment is transferred to the recipient IM user.

By explaining the delay in receipt of the IM attachment, the recipient IM user is prevented from becoming disconcerted due to the delay. Further, because the recipient IM user is aware that the received IM attachment is clean or cleansed, the recipient IM user feels more secure in receive and opening the IM attachment.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

In accordance with one embodiment, an IM comforting process 200 (FIG. 2) includes intercepting transfer of a file such as an IM attachment in an INTERCEPT FILE TRANSFER OPERATION 204, providing a comforting message that the IM attachment is being delayed in a PROVIDE COMFORTING MESSAGE OPERATION 216, and evaluating the IM attachment for malicious code in an EVALUATE FILE OPERATION 218. Upon a determination that the IM attachment is non-malicious in a FILE MALICIOUS CHECK OPERATION 220, the IM attachment is transferred in a TRANSFER FILE OPERATION 208, e.g., to the recipient IM user.

By explaining the delay in receipt of the IM attachment, the recipient IM user is prevented from becoming disconcerted due to the delay. Further, because the recipient IM user is aware that the received IM attachment is clean or cleansed, the recipient IM user feels more secure in receive and opening the IM attachment.

Figure 1:
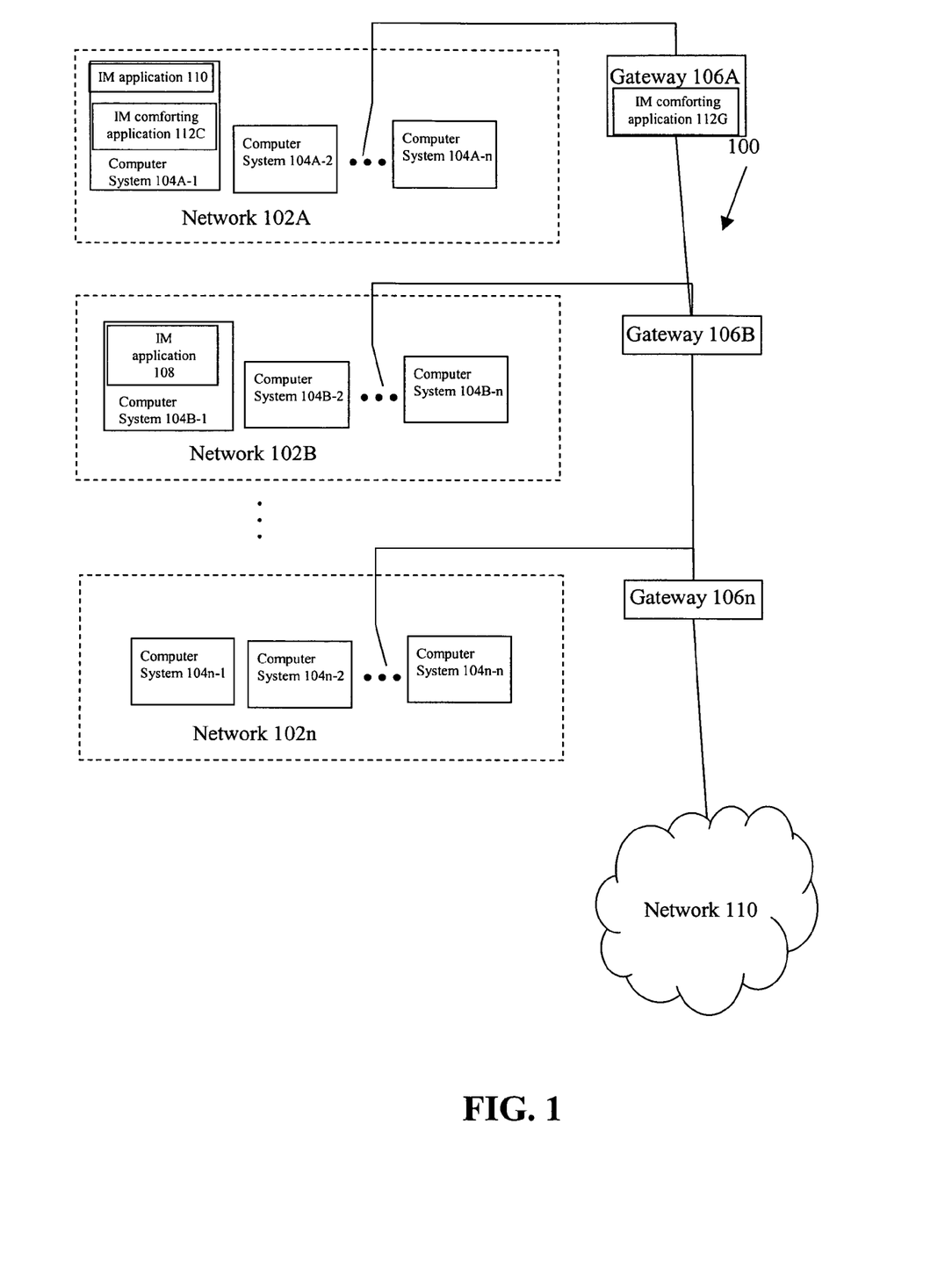
FIG. 1 is a diagram of a computer system that includes a plurality of networks in accordance with one embodiment of the present invention.

More particularly, FIG. 1 is a diagram of a computer system 100 that includes a plurality of networks 102A, 102B, . . . , 102n, collectively networks 102, in accordance with one embodiment of the present invention. Referring to network 102A, network 102A includes a plurality of interconnected computer systems 104A-1, 104A-2, . . . , 104A-n, collectively computer systems 104A.

Similarly, networks 102B, . . . , 102n also include a plurality of interconnected computer systems 104B-1, 104B-2, . . . , 104B-n, . . . , 104n-1, 104n-2, . . . , 104n-n, respectively. Computer systems 104B-1, 104B-2, . . . , 104B-n, . . . , 104n-1, 104n-2, . . . , 104n-n, are collectively referred to as computer systems 104B, . . . , 104n, respectively. Further, computer systems 104A, 104B, . . . , 104n are collectively referred to as computer systems 104.

In accordance with the embodiment illustrated in FIG. 1, each of networks 102A, 102B, . . . , 102n extends to a gateway 106A, 106B, . . . , 106n, respectively, e.g., layer 3 switches/routers.

Networks 102, and, more particularly, computer systems 104 are coupled to a network 110 though gateways 106. Network 110 is any network or network system that is of interest to a user.

Computer system 104A-1, e.g., a first computer system, in network 102A includes an instant messaging (IM) application 110 and an IM comforting application 112C. Further, computer system 104B-1 in network 102B includes an IM application 108. Still further, gateway 106A includes an IM comforting application 112G.

IM applications 108, 110 are representative and any one of a number of instant messaging applications and the particular instant messaging application used is not essential to this embodiment. Generally, IM applications 110, 108 allow the users of computer systems 104A-1, 104B-1, respectively, to engaged in an IM session with one another (and/or with other IM users). During an IM session, users of computer systems 104A-1, 104B-1 send messages, i.e., instant messages, and/or IM attachments to one another in real-time. This real-time transmission of messages is referred to as instant messaging, sometimes called chatting.

To illustrate, a sending IM user using IM application 108 sends an instant message and an IM attachment from computer system 104B-1 to computer system 104A-1. The instant message refers to the IM attachment and recites "here is the file". Accordingly, upon receipt of the instant message "here is the file", the recipient IM user of IM application 110 on computer system 104A-1 expects to instantaneously, i.e., in real-time, receive the IM attachment. As is readily evident, any delay in the IM attachment is disconcerting to the recipient IM user of IM application 110 on computer system 104A-1.

IM comforting application 112C includes a client proxy that hooks into IM traffic, e.g., transmission of instant messages and IM attachments, to and from computer system 104A-1. Similarly, IM comforting application 112G includes a gateway proxy that hooks into IM traffic, e.g., transmission of instant messages and IM attachments, to and from network 102A and/or between computer systems 104A.

As discussed further below, IM comforting applications 112C, 112G strip IM attachments from the IM traffic, queue the attachments for scanning, and provide comforting messages to the IM user(s) about the delayed IM attachments. For example, the comforting message explains that the IM attachment is being evaluated for malicious code. In one embodiment, the comforting message also provides a link to follow to obtain updates on the status of the IM attachment or itself includes a means to obtain updates on the status of the IM attachment. In another embodiment, after the IM attachment is determined to be non-malicious or cleansed to be non-malicious, the comforting message also provides a link to follow to obtain the clean or cleansed IM attachment or itself includes a means to obtain the clean or cleansed IM attachment.

In this manner, the recipient IM user is informed: (1) that the IM attachment is being delayed; (2) of the purpose of the delay; (3) of the status of the delay; and (4) as to how to retrieve the clean or cleansed IM attachment. By explaining the delay in receipt of the IM attachment, the recipient IM user is prevented from becoming disconcerted due to the delay. Further, because the recipient IM user is aware that the received IM attachment is clean or cleansed, the recipient IM user feels more secure in receive and opening the IM attachment.

Figure 2:
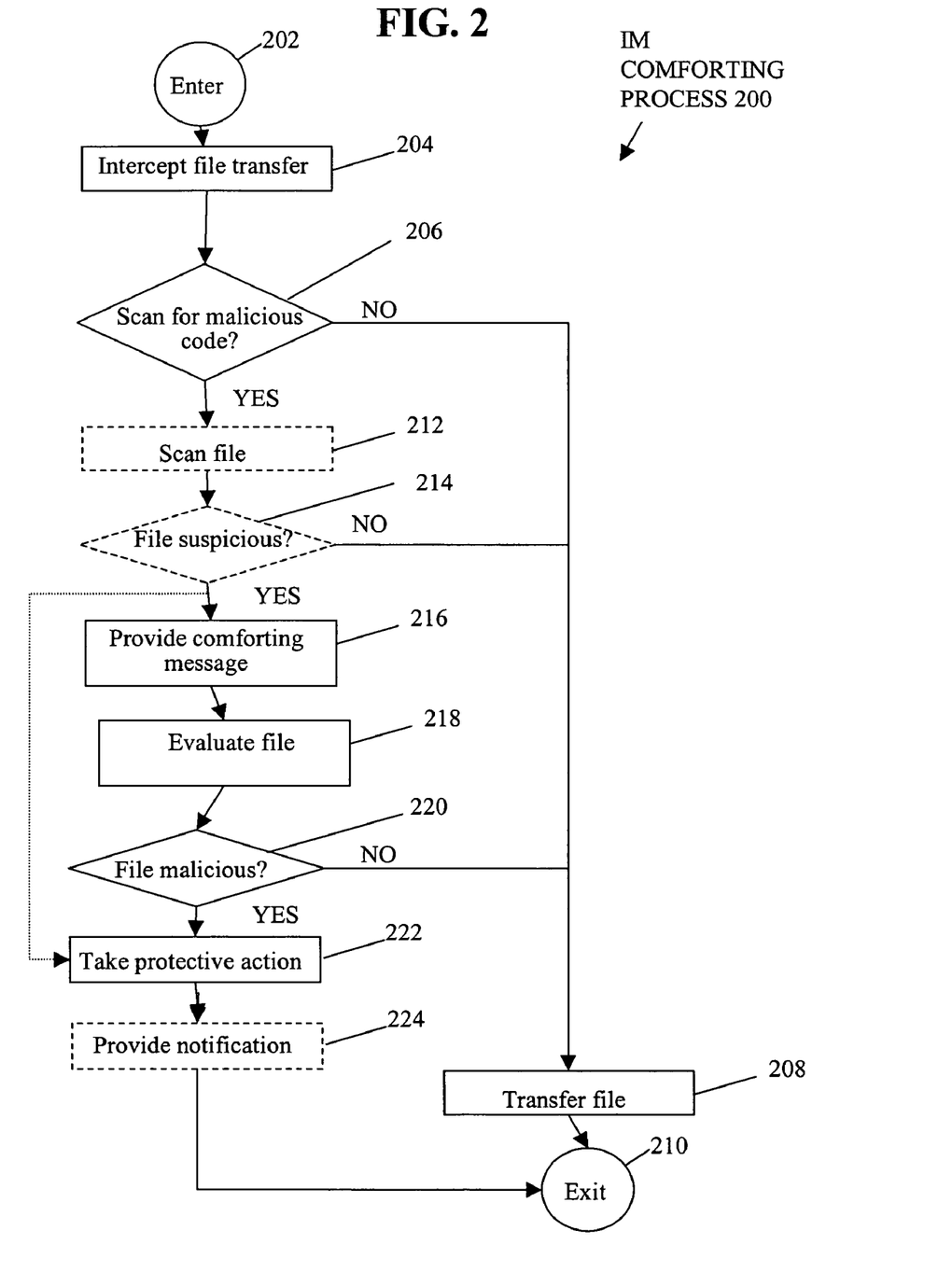
FIG. 2 is a flow diagram of an IM comforting process in accordance with one embodiment of the present invention.

FIG. 2 is a flow diagram of an IM comforting process 200 in accordance with one embodiment of the present invention. Execution of an IM comforting application on gateway(s) 106 and/or computer system(s) 104 results in the operations of IM comforting process 200 as described below in one embodiment.

Referring now to FIGS. 1 and 2 together, from an ENTER OPERATION 202, flow moves to an INTERCEPT FILE TRANSFER OPERATION 204. In INTERCEPT FILE TRANSFER OPERATION 204, transfer of a file is intercepted.

Illustratively, the file is an IM attachment being sent from a sending IM user using computer system 104B-1 to a recipient IM user using computer system 104A-1. The file will hereinafter be referred to as an IM attachment although it is understood that the file is another type of file in another embodiment, e.g., is a file downloaded from a webpage, is a file attached to an e-mail, and/or other transferred file. The IM attachment is intercepted by IM comforting application 112G on gateway 106A. In another embodiment, the IM attachment is intercepted by IM comforting application 112C on computer system 104A-1.

From INTERCEPT FILE TRANSFER OPERATION 204, flow moves to a SCAN FOR MALICIOUS CODE CHECK OPERATION 206. In SCAN FOR MALICIOUS CODE CHECK OPERATION 206, a determination is made as to whether the IM attachment is to be scanned for malicious code. In one embodiment, malicious code is defined as any computer program, module, set of modules, or code that enters a computer system without an authorized user's knowledge and/or without an authorized user's consent.

Illustratively, if the IM attachment is a known safe file, a determination is made that the IM attachment is not to be scanned for malicious code. In one embodiment, the file type of the IM attachment is determined. If the file type is a safe type, e.g., a type of file that does not or is highly unlikely to contain malicious code, a determination is made that the IM attachment is not to be scanned for malicious code. Illustratively, a user or administrator configures (defines) which file types are safe. In another embodiment, if the IM attachment is sent from a trusted source, e.g., trusted computer system, a determination is made that the IM attachment is not to be scanned for malicious code.

If a determination is made that the IM attachment is not to be scanned for malicious code, flow moves from SCAN FOR MALICIOUS CODE CHECK OPERATION 206 to a TRANSFER FILE OPERATION 208. In TRANSFER FILE OPERATION 208, the IM attachment is transferred, e.g., to the designated computer system. For example, the IM attachment is transferred to computer system 104A-1 and, more particularly, IM application 110.

Thus, in accordance with this embodiment, upon a determination that the IM attachment is a known safe file, the IM attachment is transferred to the designated computer system. SCAN FOR MALICIOUS CODE CHECK OPERATION 206 consumes little resources and thus is extremely fast, e.g., one second or less. Accordingly, the recipient IM user receives the IM attachment essentially instantaneously in accordance with the recipient IM user's expectation. From TRANSFER FILE OPERATION 208, flow moves to and exits at an EXIT OPERATION 210 or returns to INTERCEPT FILE TRANSFER OPERATION 204 to intercept another file transfer.

Conversely, if a determination is made that the IM attachment is to be scanned for malicious code, flow moves from SCAN FOR MALICIOUS CODE CHECK OPERATION 206, optionally, to a SCAN FILE OPERATION 212. For example, if the file type is not a safe file type and the IM attachment is being sent from an un-trusted source, a determination is made that the IM attachment is to be scanned for malicious code and flow moves to SCAN FILE OPERATION 212.

In SCAN FILE OPERATION 212, the IM attachment is scanned for malicious code, e.g., using an antivirus scanner. Illustratively, the IM attachment is scanned for malicious signatures, e.g., known sequence of bytes indicating that the IM attachment contains malicious code. The IM attachment is scanned using any one of a number of techniques and the particular technique used is not essential to this embodiment of the present invention.

From SCAN FILE OPERATION 212, flow moves, optionally, to a FILE SUSPICIOUS CHECK OPERATION 214. In FILE SUSPICIOUS CHECK OPERATION 214, a determination is made based on the scan performed in SCAN FILE OPERATION 212 as to whether the IM attachment is suspicious or not.

If a determination is made that the IM attachment is not suspicious, flow moves from FILE SUSPICIOUS CHECK OPERATION 214 to TRANSFER FILE OPERATION 208, which is performed as discussed above. In accordance with this embodiment, the IM attachment is not suspicious, i.e., is safe, and the IM attachment is transferred to the designated computer system. SCAN FILE OPERATION 212 and FILE SUSPICIOUS CHECK OPERATION 214 consume little resources and thus are extremely fast, e.g., one second or less. Accordingly, the recipient IM user receives the file essentially instantaneously, i.e., without delay, in accordance with the recipient IM user's expectation.

Conversely, if a determination is made that the file is suspicious in FILE SUSPICIOUS CHECK OPERATION 214, flow moves from FILE SUSPICIOUS CHECK OPERATION 214 to a PROVIDE COMFORTING MESSAGE OPERATION 216. In PROVIDE COMFORTING MESSAGE OPERATION 216, a comforting message such as a comforting message discussed above is provided, e.g., to the recipient IM user. By explaining the delay in receipt of the IM attachment, the recipient IM user is prevented from becoming disconcerted due to the delay.

From PROVIDE COMFORTING MESSAGE OPERATION 216, flow moves to an EVALUATE FILE OPERATION 218. In EVALUATE FILE OPERATION 218, the IM attachment is evaluated for malicious code.

In one embodiment, EVALUATE FILE OPERATION 218 is a resource intensive operation, i.e., takes a long time such as 5, 10, or 15 minutes or more. Illustratively, the IM attachment is isolated, executed and the behavior of the IM attachment during execution is observed during EVALUATE FILE OPERATION 218.

From EVALUATE FILE OPERATION 218, flow moves to a FILE MALICIOUS CHECK OPERATION 220. In FILE MALICIOUS CHECK OPERATION 220, a determination is made that the IM attachment is malicious, i.e. contains malicious code, or is non-malicious, i.e., has an absence of malicious code. The determination that the IM attachment is malicious or non-malicious is based upon the evaluation of the IM attachment performed in EVALUATE FILE OPERATION 218.

Illustratively, the IM attachment is isolated, executed and the behavior of the file during execution is observed during EVALUATE FILE OPERATION 218 as discussed above. The determination that the IM attachment is malicious or non-malicious in FILE MALICIOUS CHECK OPERATION 220 is based upon the observed behavior of the IM attachment during execution. Specifically, if the IM attachment behaves in a malicious manner, a determination is made that the IM attachment is malicious. Conversely, if the IM attachment behaves in a non-malicious manner, a determination is made that the file is non-malicious.

In another example, malicious code is discovered in the IM attachment. However, the malicious code in the IM attachment is removed or otherwise rendered harmless, i.e., the IM attachment is sanitized (cleansed) and thus safe. In accordance with this example, a determination is made that the IM attachment is non-malicious in FILE MALICIOUS CHECK OPERATION 220.

Although various examples are provided, EVALUATE FILE OPERATION 218 and FILE MALICIOUS CHECK OPERATION 220 can be performed using any one of a number of techniques and the particular technique used is not essential to this embodiment of the present invention.

If a determination is made that the IM attachment is non-malicious, flow moves from FILE MALICIOUS CHECK OPERATION 220 to TRANSFER FILE OPERATION 208, which is performed as discussed above. In accordance with this embodiment, the IM attachment is non-malicious, i.e., is safe, and the IM attachment is transferred to the designated computer system.

EVALUATE FILE OPERATION 218 and FILE MALICIOUS CHECK OPERATION 220 are resource intensive operations and thus are extremely slow, e.g., take 5, 10, or 15 minutes or more to performed. However, by informing the recipient IM user about the delay in receipt of the IM attachment through the comforting message as discussed further herein, the recipient IM user is prevented from becoming disconcerted about the delay in receipt of the IM attachment.

Generally, EVALUATE FILE OPERATION 218 and FILE MALICIOUS CHECK OPERATION 220 take longer to perform than SCAN FILE OPERATION 212 and FILE SUSPICIOUS CHECK OPERATION 214. Illustratively, the IM attachment is scanned for known virus signatures in SCAN FILE OPERATION 212 in less than one second whereas the IM attachment is executed and observed in EVALUATE FILE OPERATION 218 in 5, 10, or 15 minutes or more. Stated another way, performance of SCAN FILE OPERATION 212 and FILE SUSPICIOUS CHECK OPERATION 214 does not result in a delay in the transfer of the IM attachment to the recipient IM user. Conversely, performance of EVALUATE FILE OPERATION 218 and FILE MALICIOUS CHECK OPERATION 220 do result in a delay in the transfer the IM attachment to the recipient IM user and so are non real-time events. As used herein, a delay is when the transfer of the IM attachment is stalled for an amount of time, e.g., one minute or more, which is noticeable to an average recipient IM user.

As set forth above, SCAN FILE OPERATION 212 and FILE SUSPICIOUS CHECK OPERATION 214 are optional and in one embodiment are not performed. In accordance with this embodiment, upon a determination that the IM attachment is to be scanned for malicious code in SCAN FOR MALICIOUS CODE CHECK OPERATION 206, flow moves directly to PROVIDE COMFORTING MESSAGE OPERATION 216. For example, EVALUATE FILE OPERATION 218 itself includes a virus scan of the IM attachment for known signatures, e.g., includes SCAN FILE OPERATION 212 and thus SCAN FILE OPERATION 212 and FILE SUSPICIOUS CHECK OPERATION 214 are not performed.

Conversely, if a determination is made that the IM attachment is malicious, flow moves from FILE MALICIOUS CHECK OPERATION 220 to a TAKE PROTECTIVE ACTION OPERATION 222. In TAKE PROTECTIVE ACTION OPERATION 222, protective action is taken to prevent the IM attachment from being executed. Illustratively, the IM attachment is sent to a quarantine or is otherwise contained or destroyed.

In one embodiment, the IM attachment is determined to be malicious in FILE SUSPICIOUS CHECK OPERATION 214. Illustratively, the virus scan of the IM attachment locates malicious code within the IM attachment and the IM attachment cannot be cleansed or otherwise rendered non-malicious. In accordance with this embodiment, flow moves directly from FILE SUSPICIOUS CHECK OPERATION 214 to TAKE PROTECTIVE ACTION OPERATION 222, which is performed as discussed above.

From TAKE PROTECTIVE ACTION OPERATION 222 flow moves, optionally, to a PROVIDE NOTIFICATION OPERATION 224 (or directly to EXIT OPERATION 210 if PROVIDE NOTIFICATION OPERATION 224 is not performed). In PROVIDE NOTIFICATION OPERATION 224, a notification is provided that protective action has been taken. Illustratively, the recipient IM user is notified that the recipient IM user is not receiving the IM attachment. In one embodiment, the recipient IM user is also notified that the IM attachment contained malicious code and/or that the IM attachment has been sent to quarantine or otherwise contained or destroyed.

In one embodiment, an administrator is notified that malicious code has been detected and protective action taken. Other notifications include generating a log file and submitting a sample of the malicious code to a security center. From PROVIDE NOTIFICATION OPERATION 224, flow moves to and exits at EXIT OPERATION 210 or returns to INTERCEPT FILE TRANSFER OPERATION 204 for interception of another file transfer.

Figure 3:
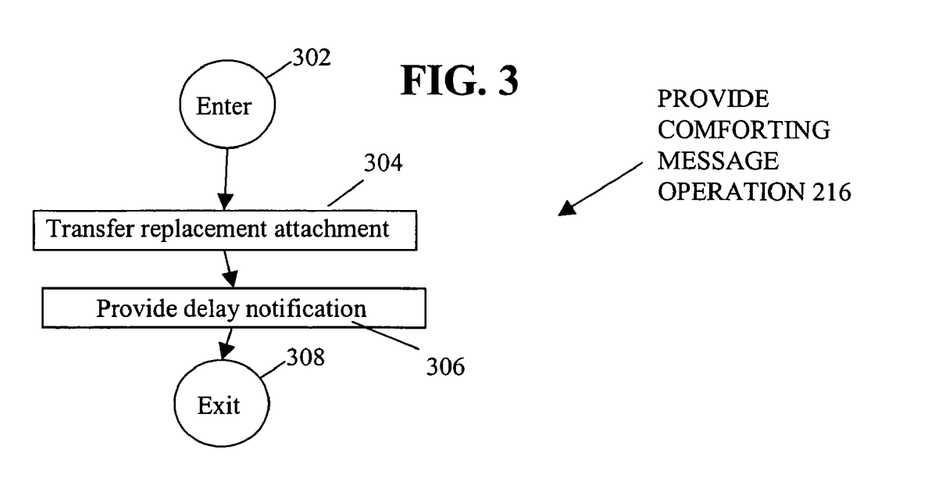
FIG. 3 is a flow diagram of a PROVIDE COMFORTING MESSAGE OPERATION of the IM comforting process of FIG. 2 in accordance with one embodiment of the present invention.
Figure 4:
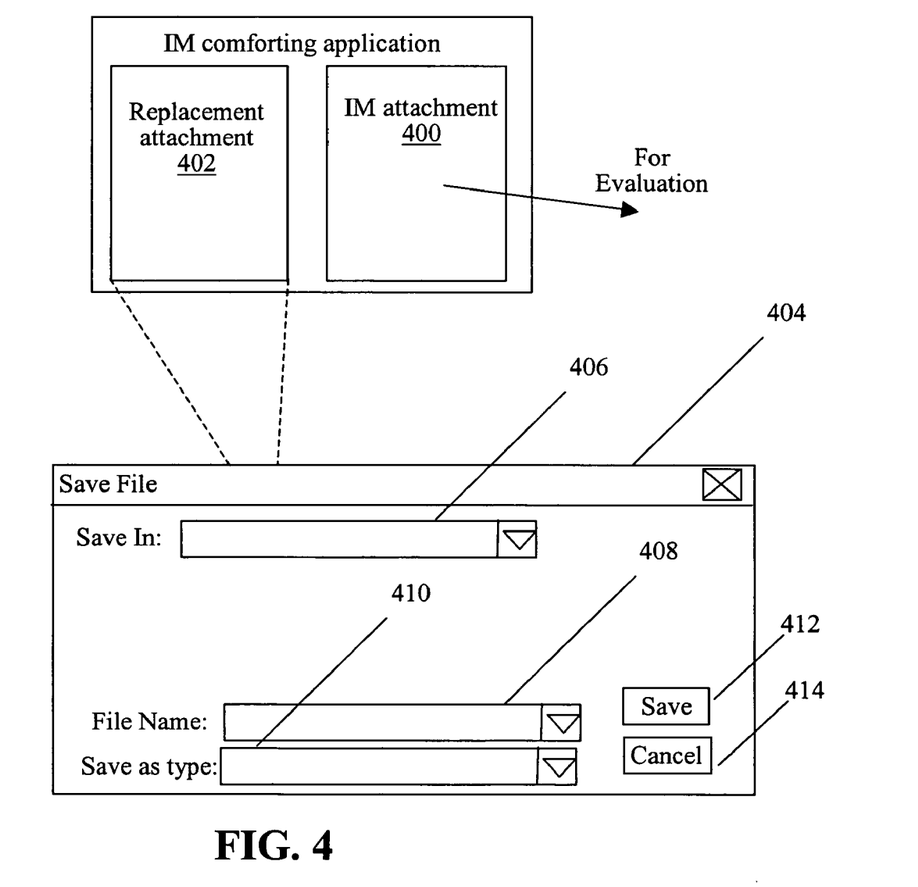
FIG. 4 is a diagram illustrating the transfer of a replacement attachment in accordance with one embodiment of the present invention.

FIG. 3 is a flow diagram of PROVIDE COMFORTING MESSAGE OPERATION 216 of IM comforting process 200 of FIG. 2 in accordance with one embodiment of the present invention. FIG. 4 is a diagram illustrating the transfer of a replacement attachment 402 in accordance with one embodiment of the present invention. Referring now to FIGS. 2, 3, and 4 together, from an ENTER OPERATION 302 (and from FILE SUSPICIOUS CHECK OPERATION 214), flow moves to a TRANSFER REPLACEMENT ATTACHMENT OPERATION 304. In TRANSFER REPLACEMENT ATTACHMENT OPERATION 304, a replacement attachment is transferred, e.g., to the recipient IM user. Illustratively, upon being sent an IM attachment 400, the recipient IM user is presented with an IM attachment acceptance user interface (not shown) asking the recipient IM user whether the recipient IM user will accept an IM attachment from the sending IM user. IM attachment acceptance user interfaces are well-known to those of skill in the art and so are not discussed further to avoid detracting from the principles of the invention.

Upon accepting the IM attachment, e.g., clicking a yes button in the IM attachment acceptance user interface, the recipient IM user is presented with a save IM attachment user interface 404. Save IM attachment user interface 404 is a conventional user interface, e.g., generated by the operating system of the recipient IM user's computer system.

Illustratively, save IM attachment user interface 404 includes a save in field 406 in which the recipient IM user selects the memory location in which the IM attachment is to be saved, e.g., a floppy disk or hard drive in the recipient IM user's computer system or memory location on a network. Further, save IM attachment user interface 404 includes a file name field 408 and a save as type field 410 in which the recipient IM user insert/selects the name of the IM attachment and the type that the IM attachment is to be saved as.

Upon completion of save in field 406, file name field 408, save as type field 410, the recipient IM user clicks a save button 412. Conventionally, clicking save button 412 would download and save IM attachment 400 according to the recipient IM user's preferences set forth in save in field 406, file name field 408, and save as type field 410. However, in accordance with this embodiment, instead of saving IM attachment 400, replacement attachment 402 is saved according to the recipient IM user's preferences set forth in save in field 406, file name field 408, save as type field 410. Note save IM attachment user interface 404 also include a cancel button 414 for canceling the IM attachment transfer.

Figure 5:
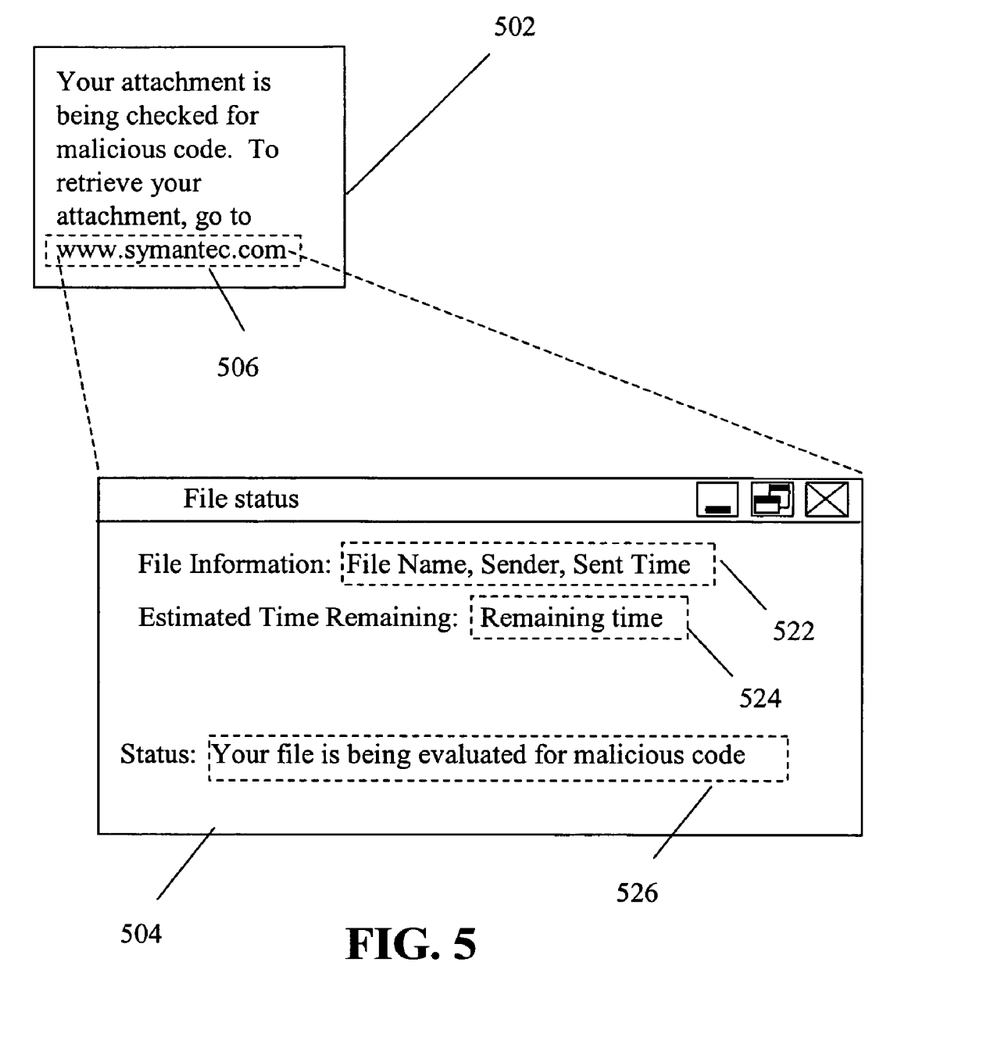
FIG. 5 illustrates a first comforting message including a link to a second comforting message in accordance with one embodiment of the present invention.

FIG. 5 illustrates a first comforting message 502 including a link to a second comforting message 504 in accordance with one embodiment of the present invention. Referring now to FIGS. 3, 4, and 5 together, upon execution of replacement attachment 402, comforting message 502, sometimes called a first window, appears on the display of the recipient IM user's computer system. Generally, comforting message 502 informs the recipient IM user that the IM attachment is being delayed and provides a link to a location where detailed status of the IM attachment is available.

More particularly, comforting message 502 informs the recipient IM user that "Your attachment is being checked for malicious code. To retrieve your attachment, go to www.symantec.com". In accordance with this embodiment, comforting message 502 includes a link 506 (www.symantec.com as an illustration only) to a location, e.g., Internet protocol (IP) address, where detailed status of the IM attachment is available.

Upon clicking, sometimes called activating, link 506, a second comforting message 504, sometimes called a window, appears on the recipient IM user's display. Illustratively, clicking on link 506 launches a browser, e.g., Microsoft's Internet Explorer, Netscape Navigator or other browser, on the recipient IM user's computer system. The browser goes to the web page specified by link 506, i.e., retrieves information from a computer system at the IP address specified by link 506, which appears as comforting message 504. In another embodiment, the recipient IM user copies link 506 and inserts link 506 into a browser to get to the web page specified by link 506 as those of skill in the art will understand in light of this disclosure.

In accordance with this embodiment, comforting message 504 includes file information 522, estimated time remaining information 524, and status information 526. File information 522 includes information about the IM attachment such as the file name, the sender of the file, e.g., the sending IM user, and the sent time when the file was sent although more or less file information is provided in other embodiments. Estimated time remaining information 524 includes an estimate as to how much time remains until the IM attachment is available to the recipient IM user.

Status information 526 provides status on the IM attachment such as that the IM attachment is being delayed or the IM attachment is available. As shown in FIG. 5, status information 526 sets forth that "Your file is being evaluated for malicious code" although the particular wording used is not essential to this embodiment of the present invention.

In accordance with another embodiment, referring to FIGS. 4 and 5 together, execution of replacement attachment 402 generates comforting message 504 directly and without initially generating comforting message 502.

For example, upon execution of replacement attachment 402, comforting message 504 appears on the recipient IM user's display. Illustratively, execution of replacement attachment 402 launches a browser, e.g., Microsoft's Internet Explorer, Netscape Navigator or other browser, on the recipient IM user's computer system. The browser goes to the web page specified by replacement attachment 402, i.e., retrieves information from a computer system at an IP address specified by replacement attachment 402, which appears as comforting message 504.

In another embodiment, replacement attachment 402 includes code to generate comforting message 504 without use of a browser. Replacement attachment 402 goes to the specified web page, i.e., retrieves information from a computer system at an IP address specified by replacement attachment 402, which appears as comforting message 504.

Comforting message 504 periodically refreshes such that file information 522, estimated time remaining information 524, and status information 526 is also periodically refreshed, i.e., updated. In one embodiment, estimated time remaining information 524 is refreshed such that the displayed estimated time remaining becomes less and less until it reaches zero. Upon reaching zero, status information 526 is updated to indicate to the recipient IM user that the IM attachment is available (FIG. 6) or is unavailable (FIG. 7).

Figure 6:
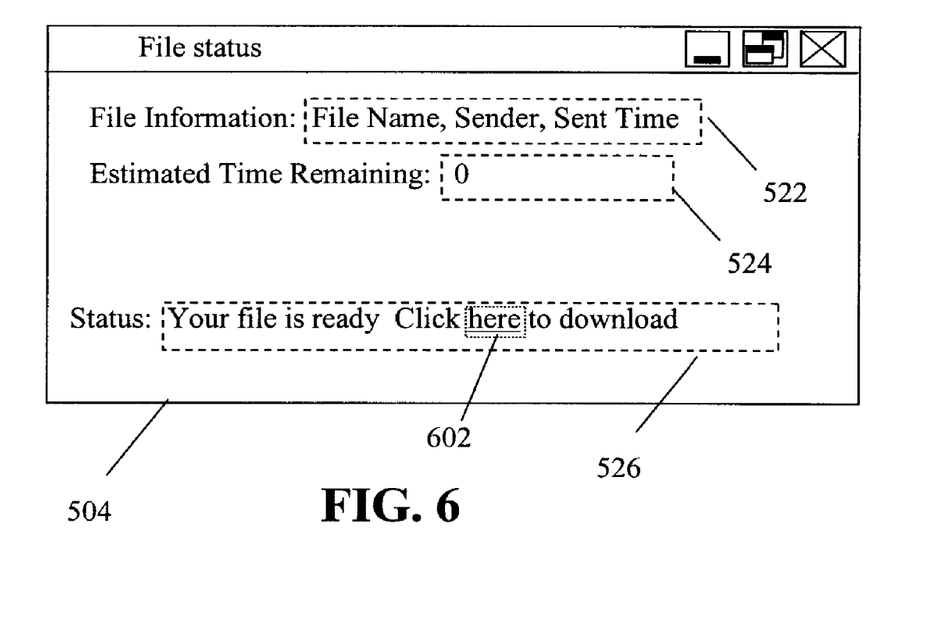
FIG. 6 illustrates the second comforting message of FIG. 5 when an IM attachment is available for a recipient IM user in accordance with one embodiment of the present invention.
Figure 7:
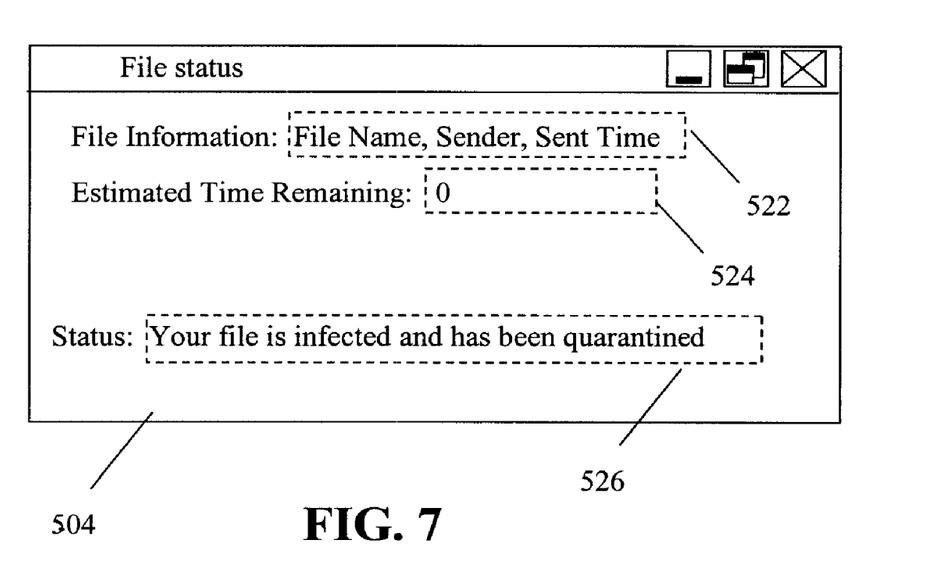
FIG. 7 illustrates the second comforting message of FIG. 5 when the IM attachment is unavailable for the recipient IM user in accordance with one embodiment of the present invention.

FIG. 6 illustrates comforting message 504, sometimes called window, of FIG. 5 when the IM attachment is available for the recipient IM user in accordance with one embodiment of the present invention. Referring now to FIG. 6, estimated time remaining information 524 displays zero, i.e., the estimated remaining time is zero.

Status information 526 indicates that the file is available and also provides information as to how to retrieve the IM attachment. As shown in FIG. 6, status information 526 sets forth that "Your file is ready. Click here to download" although the particular wording used is not essential to this embodiment of the present invention.

In accordance with this embodiment, status information 526 includes a link 602 (here as an illustration only) to a location, e.g., Internet protocol (IP) address, where the IM attachment is available.

Recall in the IM comforting process 200 of FIG. 2, the file is transferred to the recipient IM user in TRANSFER FILE OPERATION 208. In accordance with this embodiment, upon clicking on link 602, the recipient IM user is presented with save IM attachment user interface 404 of FIG. 4. As set forth above, save IM attachment user interface 404 is a conventional user interface, e.g., generated by the operating system of the recipient IM user's computer system. Save IM attachment user interface 404 is used to retrieve the original IM attachment, e.g., IM attachment 400 of FIG. 4.

In one embodiment, instead of providing link 602 for transfer of the IM attachment to the recipient IM user, the IM comforting application transfers the IM attachment using a conventional IM file transfer protocol. Illustratively, the IM comforting application on the recipient IM user's computer system is configured to accept IM attachments from the IM comforting application. Thus, when the IM attachment is available, the recipient IM user receives a notification that the IM attachment is being sent from the IM comforting application. The recipient IM user then retrieves the IM attachment in a conventional manner as discussed above.

In another embodiment, replacement attachment 402 is a place keeper application. Upon execution of replacement attachment 402, replacement attachment 402 checks on the status of IM attachment 400. When IM attachment 400 is available, replacement attachment 402 automatically transfers IM attachment 400 in TRANSFER FILE OPERATION 208.

Referring again to FIG. 2, in another embodiment, the IM attachment is determined to be malicious in FILE MALICIOUS CHECK OPERATION 220. After taking protective action in TAKE PROTECTIVE ACTION OPERATION 222, a notification is provided in PROVIDE NOTIFICATION OPERATION 224. In one embodiment, the notification is provided by comforting message 504 as shown in FIG. 7.

FIG. 7 illustrates comforting message 504 of FIG. 5 when the IM attachment is unavailable for the recipient IM user in accordance with one embodiment of the present invention. Referring now to FIG. 7, estimated time remaining information 524 displays zero, i.e., the estimated remaining time is zero.

Status information 526 indicates that the IM attachment contains malicious code and thus is unavailable. As shown in FIG. 7, status information 526 sets forth that "Your file is infected and has been quarantined" although the particular wording used is not essential to this embodiment of the present invention.

Returning again to FIG. 3, from TRANSFER REPLACEMENT ATTACHMENT OPERATION 304, flow moves to a PROVIDE DELAY NOTIFICATION OPERATION 306. In PROVIDE DELAY NOTIFICATION OPERATION 306, the recipient IM user is notified that the IM attachment is delayed. In one embodiment, comforting message 502 of FIG. 5 is sent to the recipient IM user as an IM message. Illustratively, comforting message 502 is inserted into the IM session with the sending IM user. In another embodiment, comforting message 502 is sent as an IM message to the recipient IM user from the IM comforting application. From PROVIDE DELAY NOTIFICATION OPERATION 306, flow moves to and exits at EXIT OPERATION 308 and returns to EVALUATE FILE OPERATION 218 of FIG. 2.

In one embodiment, either TRANSFER REPLACEMENT ATTACHMENT OPERATION 304 or PROVIDE DELAY NOTIFICATION OPERATION 306 is performed, but not both.

Figure 8:
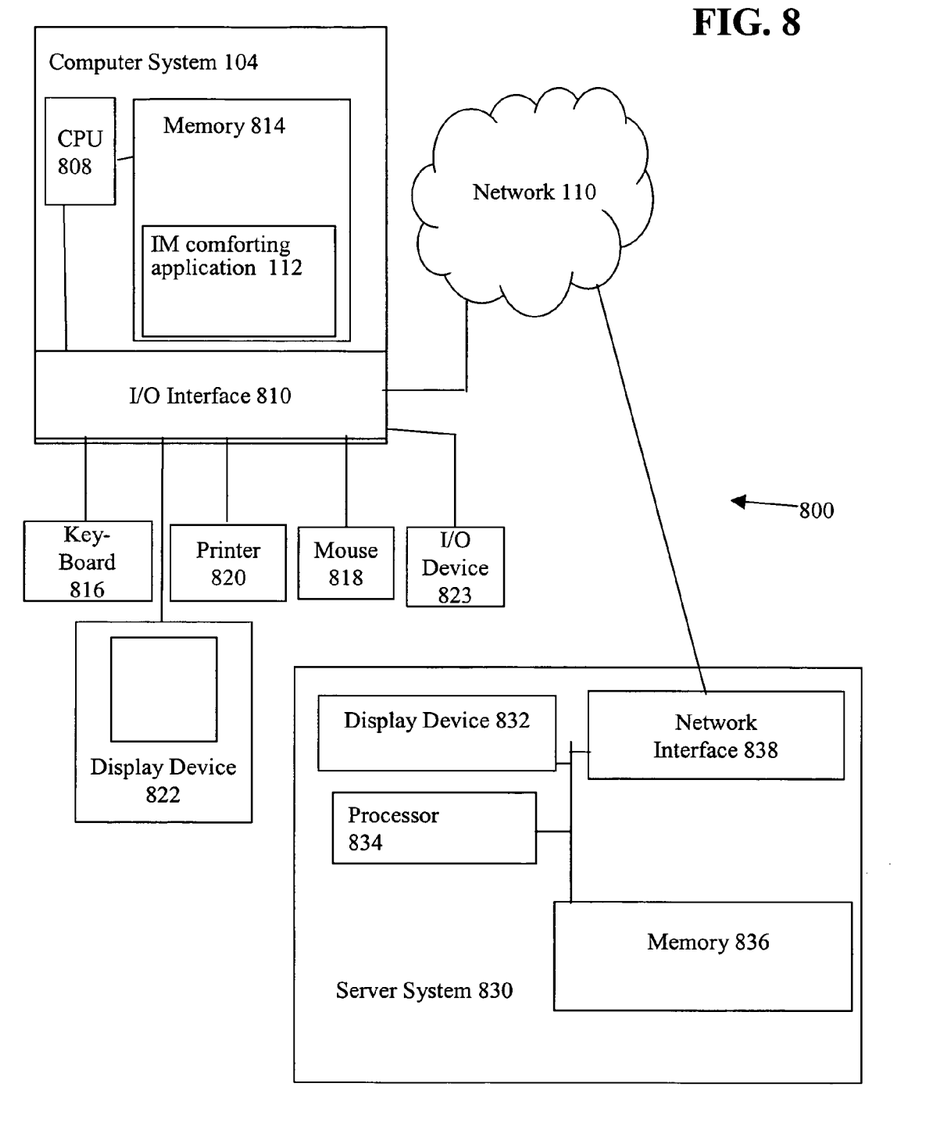
FIG. 8 is a diagram of a client-server system that includes an IM comforting application executing on a computer system in accordance with one embodiment of the present invention.

FIG. 8 is a diagram of a client-server system 800 that includes an IM comforting application 112 executing on a computer system 104, e.g., a first computer system, in accordance with one embodiment of the present invention. Referring now to FIGS. 1 and 8 together, computer system 104 is representative of a computer system 104 or gateway 106 of FIG. 1 in one embodiment. Further, client-server system 800 is part of computer system 100 (FIG. 1) in one embodiment.

Computer system 104, sometimes called a client or user device, typically includes a central processing unit (CPU) 808, hereinafter processor 808, an input output (I/O) interface 810, and a memory 814. Computer system 104 may further include standard devices like a keyboard 816, a mouse 818, a printer 820, and a display device 822, as well as, one or more standard input/output (I/O) devices 823, such as a compact disk (CD) or DVD drive, floppy disk drive, or other digital or waveform port for inputting data to and outputting data from computer system 104. In one embodiment, IM comforting application 112 is loaded into computer system 104 via I/O device 823, such as from a CD, DVD or floppy disk containing IM comforting application 112.

Computer system 104 is coupled to a server system 830 of client-server system 800 by network 110. Server system 830 typically includes a display device 832, a processor 834, a memory 836, and a network interface 838.

Network 110 can be any network or network system that is of interest to a user. In various embodiments, network interface 838 and I/O interface 810 include analog modems, digital modems, or a network interface card.

IM comforting application 112 is stored in memory 814 of computer system 104 and executed on computer system 104. The particular type of and configuration of computer system 104 and server system 830 are not essential to this embodiment of the present invention.

IM comforting application 112 is in computer memory 814. As used herein, a computer memory refers to a volatile memory, a non-volatile memory, or a combination of the two.

Although IM comforting application 112 is referred to an application, this is illustrative only. IM comforting application 112 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, execution of IM comforting application 112 by processor 808 results in the operations of IM comforting process 200.

While embodiments in accordance with the present invention have been described for a client-server configuration, an embodiment of the present invention may be carried out using any suitable hardware configuration and/or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, and servers on a network.

As illustrated in FIG. 8, this medium may belong to the computer system itself. However, the medium also may be removed from the computer system. For example, IM comforting application 112 may be stored in memory 836 that is physically located in a location different from processor 808. Processor 808 should be coupled to the memory 836. This could be accomplished in a client-server system, or alternatively via a connection to another computer via modems and analog lines, digital interfaces and a digital carrier line, or wireless or cellular connections.

More specifically, in one embodiment, computer system 104 and/or server system 830 is a portable computer, a workstation, a two-way pager, a cellular telephone, a smart phone, a digital wireless telephone, a personal digital assistant, a server computer, an Internet appliance, or any other device that includes components that can execute the IM comforting functionality in accordance with at least one of the embodiments as described herein. Similarly, in another embodiment, computer system 104 and/or server system 830 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the IM comforting functionality in accordance with one embodiment of the present invention can be implemented in a wide variety of computer system configurations. In addition, the IM comforting functionality could be stored as different modules in memories of different devices. For example, IM comforting application 112 could initially be stored in server system 830, and then as necessary, a portion of IM comforting application 112 could be transferred to computer system 104 and executed on computer system 104. Consequently, part of the IM comforting functionality would be executed on processor 834 of server system 830, and another part would be executed on processor 808 of computer system 104. In view of this disclosure, those of skill in the art can implement various embodiments of the present invention in a wide-variety of physical hardware configurations using an operating system and computer programming language of interest to the user.

In yet another embodiment, IM comforting application 112 is stored in memory 836 of server system 830. IM comforting application 112 is transferred over network 110 to memory 814 in computer system 104. In this embodiment, network interface 838 and I/O interface 810 would include analog modems, digital modems, or a network interface card. If modems are used, network 110 includes a communications network, and IM comforting application 112 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
   intercepting transfer of an instant messaging (IM) attachment;
   providing a comforting message on a display device of a computer system that said IM attachment is being delayed because said IM attachment is being evaluated for malicious code, wherein said comforting message comprises a link to status information about said IM attachment comprising an estimated time remaining until said evaluation is completed; and
   evaluating said IM attachment for malicious code, wherein upon completion of said evaluation, said status information is updated to provide results of said evaluation.

2. The computer implemented method of claim 1 further comprising transferring said IM attachment upon a determination that said IM attachment is safe.

3. The computer implemented method of claim 1 further comprising taking protective action upon a determination that said IM attachment comprises malicious code.

4. The computer implemented method of claim 3 further comprising providing a notification that said protective action has been taken.

5. The computer implemented method of claim 1 further comprising determining whether said IM attachment is to be scanned for said malicious code.

6. The computer implemented method of claim 5 wherein a determination is made that said IM attachment is not to be scanned for malicious code upon a determination that said IM attachment is a safe type of attachment.

7. The computer implemented method of claim 5 wherein a determination is made that said IM attachment is not to be scanned for malicious code upon a determination that said IM attachment is from a trusted source.

8. The computer implemented method of claim 1 further comprising scanning said IM attachment for said malicious code prior to said evaluating.

9. The computer implemented method of claim 8 wherein said scanning takes less time than said evaluating.

10. The computer implemented method of claim 8 wherein said scanning takes one second or less.

11. The computer implemented method of claim 8 wherein said evaluating is a non real-time event.

12. The computer implemented method of claim 8 further comprising determining that said IM attachment is suspicious based on said scanning.

13. The computer implemented method of claim 1 wherein said providing a comforting message comprises transferring a replacement attachment, wherein upon execution of said replacement attachment, said comforting message is displayed.

14. The computer implemented method of claim 13 wherein, upon a determination that said file IM attachment is safe, said replacement attachment automatically transfers said IM attachment.

15. The computer implemented method of claim 1 wherein said evaluating takes 5 minutes or more.

16. The computer implemented method of claim 1 wherein said evaluating comprises:
   isolating said IM attachment;
   executing said IM attachment; and
   observing a behavior of said IM attachment during said execution.

17. The computer implemented method of claim 16 wherein a determination is made that said IM attachment is malicious upon a determination that said behavior is malicious.

18. A computer system comprising:
   a memory having stored therein an instant messaging (IM) comforting application; and
   a processor coupled to said memory, wherein execution of said IM comforting application generates a method comprising:
   intercepting transfer of an instant messaging (IM) attachment;
   providing a comforting message on a display device of a computer system that said IM attachment is being delayed because said IM attachment is being evaluated for malicious code, wherein said comforting message comprises a link to status information about said IM attachment comprising an estimated time remaining until said evaluation is completed; and
   evaluating said IM attachment for malicious code, wherein upon completion of said evaluation, said status information is updated to provide results of said evaluation.

19. A computer-program product comprising a computer readable storage medium containing computer program code comprising:
   an instant messaging (IM) comforting application for intercepting transfer of an instant messaging (IM) attachment;
   said IM comforting application further for providing a comforting message on a display device of a computer system that said IM attachment is being delayed because said IM attachment is being evaluated for malicious code, wherein said comforting message comprises a link to status information about said IM attachment comprising an estimated time remaining until said evaluation is completed; and
   said IM comforting application further for evaluating said IM attachment for malicious code, wherein upon completion of said evaluation, said status information is updated to provide results of said evaluation.

20. A computer system comprising:
   a display device;
   means for intercepting transfer of an instant messaging (IM) attachment;
   means for providing a comforting message on said display device that said IM attachment is being delayed because said IM attachment is being evaluated for malicious code, wherein said comforting message comprises a link to status information about said IM attachment comprising an estimated time remaining until said evaluation is completed; and
   means for evaluating said IM attachment for malicious code, wherein upon completion of said evaluation, said status information is updated to provide results of said evaluation.

* * * * *

UNITED STATES PATENT AND TRADEMARK OFFICE
CERTIFICATE OF CORRECTION

PATENT NO. : 7,634,814 B1
APPLICATION NO. : 11/218206
DATED : December 15, 2009
INVENTOR(S) : William E. Sobel and Bruce McCorkendale It is certified that error appears in the above-identified patent and that said Letters Patent is hereby corrected as shown below:

In Claim 14, Column 13, Line 16, between "said" and "IM", delete "file".

Signed and Sealed this

Twenty-third Day of March, 2010

David J. Kappos
*Director of the United States Patent and Trademark Office*